(12) United States Patent
Dye

(10) Patent No.: US 6,902,181 B1
(45) Date of Patent: Jun. 7, 2005

(54) TRAILER HITCH HAVING RAPID ADJUSTMENT

(76) Inventor: Dewey Dye, P.O. Box 51, Webber Falls, OK (US) 74470

( * ) Notice: Subject to any disclaimer, the term of this patent is extended or adjusted under 35 U.S.C. 154(b) by 19 days.

(21) Appl. No.: 10/868,078

(22) Filed: Jun. 15, 2004

(51) Int. Cl.[7] .............................................. B60D 1/00
(52) U.S. Cl. ................ 280/478.1; 280/490.1
(58) Field of Search .............................. 280/508, 507, 280/511, 490.1, 477, 478.1, 479.3

(56) References Cited

U.S. PATENT DOCUMENTS

| | | | |
|---|---|---|---|
| 2,292,751 A * | 8/1942 | Forney | 280/482 |
| 3,860,267 A * | 1/1975 | Lyons | 280/479.3 |
| 4,073,508 A | 2/1978 | George et al. | |
| 4,214,772 A | 7/1980 | Carr et al. | |
| 4,429,895 A * | 2/1984 | Hunter | 280/490.1 |
| 4,991,865 A | 2/1991 | Francisco | |
| 5,727,805 A * | 3/1998 | La Roque | 280/478.1 |
| 5,845,921 A | 12/1998 | Stimac | |
| 5,975,553 A * | 11/1999 | Van Vleet | 280/483 |
| 6,585,280 B1 | 7/2003 | Wiers | |
| 2004/0084877 A1 * | 5/2004 | Smith | 280/490.1 |

OTHER PUBLICATIONS

Sales Brochure #S14A published by Shuck Metal Fabrication & Design 8319 U.S. Rt. 127, P.O. Box 354, Celina, Ohio 45822.

* cited by examiner

Primary Examiner—Avraham Lerner
(74) Attorney, Agent, or Firm—Lars D. Jensen

(57) ABSTRACT

An adjustable trailer hitch assembly which provides rapid and easy coupling by moving the ball to the tongue, rather than by moving the tongue to the ball. Adjustment is provided in each of three axes. Simultaneous movement in the lateral and vertical directions is provided, which after ball coupling, may be moved to a central locked and fixed position for towing. One embodiment provides selectable locked and fixed vertical positions.

16 Claims, 9 Drawing Sheets

TRAILER HITCH HAVING RAPID ADJUSTMENT

BACKGROUND

This invention relates to a new and improved trailer hitch, and more particularly, to a new and improved trailer hitch which permits the hitch ball to be rapidly adjusted in three axes for the purpose of easy coupling of a trailed vehicle.

Heretofore, various trailer hitches for cars and trucks have offered small adjustability of the hitch ball, mainly for the purpose of level pulling of a trailed vehicle, such as a boat or cattle trailer. Furthermore, these hitches are characteristically mounted with the carrying ball very close to the vehicle frame, and the vehicle must, therefore, necessarily be backed very close to and in precise alignment with the trailer tongue in order to effect proper coupling of the trailer to the hitch. As a result, during the backing operation the vehicle is frequently damaged by bumping the trailer tongue, and unless the ball attached to the hitch is in perfect alignment with the trailer ball receptacle, the receptacle will not lock positively onto the ball and extensive additional maneuvering of the vehicle or trailer tongue is frequently necessary to achieve a firm and positive lock. This problem is exacerbated where there is a large load on the trailer tongue, or where the trailer is in an inaccessible position, which prevents ready maneuvering of the trailer ball receptacle into alignment with the ball located on the hitch.

Many attempts have been made to develop an adjustable trailer hitch equipped with a ball which may be extended and retracted from the vehicle frame in order to minimize the problem of trailer-to-hitch alignment. These efforts have chiefly taken the form of connectors which are telescoping in nature, and which may be lengthened or shortened as desired by the removal and insertion of pins from a telescoping ball-carrying member. However, many of these devices are functionally limited, since the ball can be moved only on a single axis extending to and from the vehicle frame. Accordingly, if after a towing vehicle is backed up, the ball receptacle is located on an axis not in line with the extension and retraction axis, then the same problem of maneuvering the trailer into alignment with the ball on the trailer hitch is presented.

Some prior art designs such as U.S. Pat. No. 4,214,772 to Carr, et al, and U.S. Pat. No. 6,585,280 to Wiers have lateral adjustment, however such actions involve bolted slots (requiring hand tools) or leads crews (which are slow-acting,) being directed mainly at shifting from a large ball to a small ball, or to locate the place on the road the trailed vehicle follows.

Some prior art designs, such as U.S. Pat. No. 4,073,508 to George, et al, and U.S. Pat. No. 4,991,865 to Francisco provide lateral adjustment without desirable simultaneous vertical adjustment.

The prior art design disclosed in U.S. Pat. No. 5,845,921 provides simultaneous adjustment in three axes. However, the present invention will provide this action with a completely different and more rugged construction.

SUMMARY

Accordingly, the present invention makes possible a new coupling method. Firstly, the towing vehicle is driven rearwardly, so the hitch of the present invention is within the vicinity of the trailer tongue. Then, the ball member of the present invention is rapidly and easily adjusted to and into the receptacle on the end of the trailer tongue. Note that "moving the ball to the trailer" is the opposite of the usual manner. Then, the ball and receptacle can be latched together in the conventional manner. Now, the trailer is connected, although flexibly so, to the towing vehicle. All that remains is to restore the hitch of the present invention to its locked position by maneuvering the trailer by its tongue, a task which is made easier by the guidance provided by the present invention.

One objective of the present invention is to provide a support for a hitch ball which can simultaneously adjust in the lateral and vertical directions. This is accomplished by mounting the hitch ball on a horizontal arm, which arm is attached to a vertical post which fits inside a cylindrical with sliding contact. Whereby, the hitch ball may be rotated laterally, left or right, and lifted or lowered, simultaneously, rapidly, and easily.

Another objective of the present invention is to provide a support for a hitch ball which can simultaneously adjust in the lateral, longitudinal, and vertical directions. This is accomplished by mounting the hitch ball on a horizontal arm, which arm is attached to a vertical post which fits inside a cylinder with sliding contact, which collar is attached to a support bar which fits with a telescopically sliding fit inside a hollow receiver. Whereby, the hitch ball may be rotated laterally, left or right, and lifted or lowered, and slid forward or rearward, all simultaneously, rapidly, and easily.

Another objective of the present invention is to provide a support for a hitch ball which can simultaneously adjust in three axes for coupling and latching, which thereafter can be moved to a locked position. This is accomplished by providing a lock member, such as a key or pin, to restrain the hitch ball from moving laterally or downward.

Another objective of the present invention is to provide a support for a hitch ball which can simultaneously adjust in three axes for coupling and latching, which thereafter can be moved to a locked position which is thereafter fixed for road towing. This is accomplished by providing a lock member, such as a key or pin, to restrain the hitch ball from moving laterally or downward, and a by providing a fixing pin to additionally restrain the ball from moving upward.

These and other features, aspects, and advantages of the present invention will become better understood with regard to the following description, appended claims, and accompanying drawings.

BRIEF DESCRIPTION OF THE DRAWINGS

The following drawings describe the present invention.

REFERENCE NUMERALS USED IN THE DRAWINGS

Figure 1:
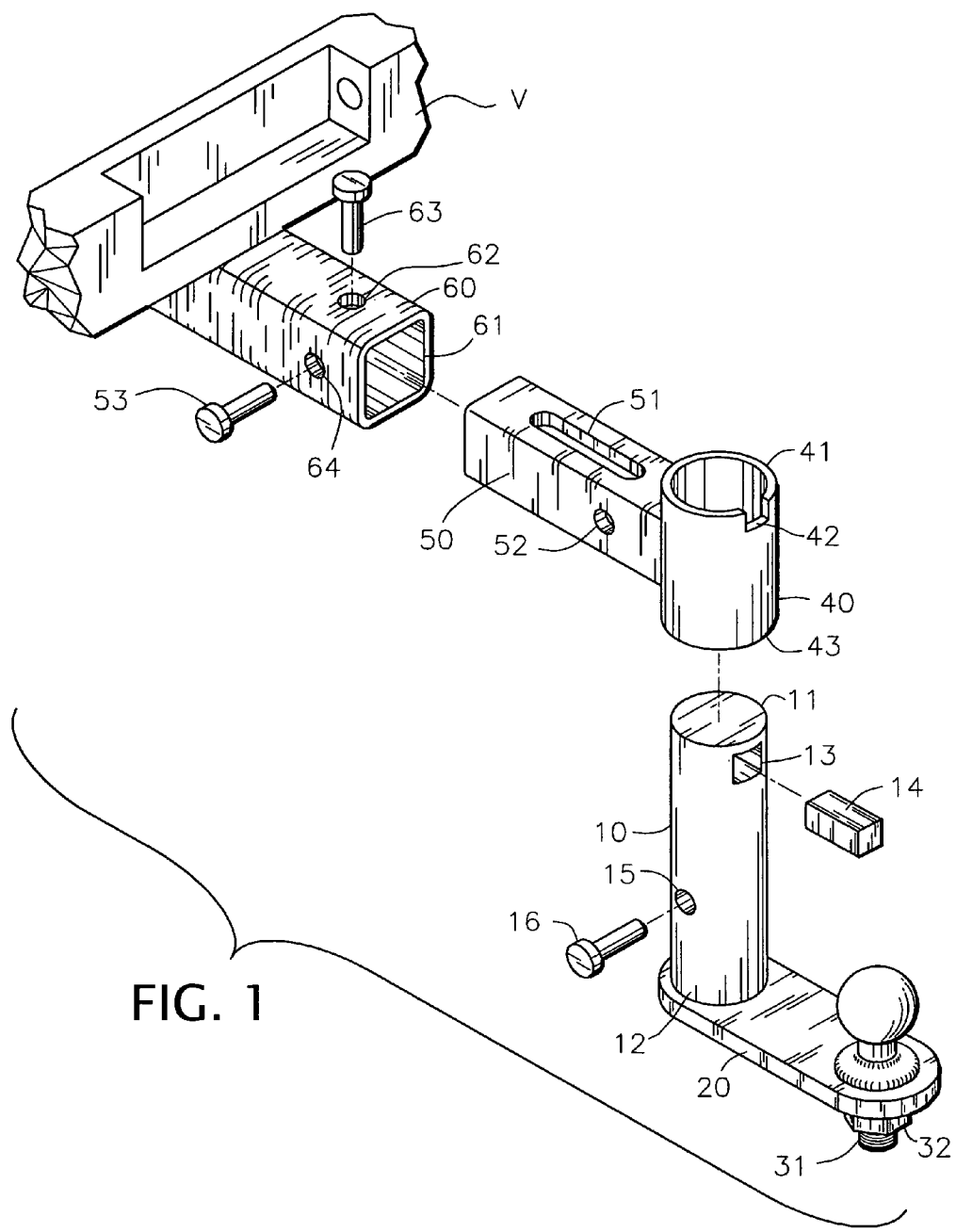
FIG. 1 is an exploded view of a first embodiment of the present invention.

The following is a listing of the referenced parts:
10 post
11 top end
12 bottom end
13 lock opening
14 lock key
15 fixing opening
16 fixing pin
20 arm
30 hitch ball
31 threaded stud
32 nut
40 cylinder
41 upper edge
42 lock groove
43 lower edge
50 support bar
51 slot
52 holding hole
53 holding pin
60 receiver tube
61 inside opening
62 slot pin opening
63 slot pin
64 holding pin opening
71 rearward direction
72 lateral swing-out direction
73 lift direction
74 downward direction
75 swing in and drop direction
76 forward direction
110 post
111 top end
112 bottom end
114 lock key
115 fixing opening
116 fixing pin
120 arm
140 cylinder
141 upper edge
142 lock groove
143 lower edge
150 support bar
210 post tube
211 top end
212 bottom end
213A lock opening
213B mating lock opening
214 lock pin
215A fixing opening
216 fixing pin
220 arm
240 cylinder
241 upper edge
242A first lock groove
242B second lock groove
243 lower edge
250 support bar
310 post tube
311 top end
312 bottom end
313A lock opening
314 lock pin
315A fixing opening
316 fixing pin
320 arm
340 cylinder
341 upper edge
342A first lock groove
342B second lock groove
343 lower edge
350 support bar
410 post tube
411 top end
412 bottom end
413A first lock opening
414 lock pin
415A first fixing opening
416 fixing pin
420 arm
440 cylinder
441 upper edge
442A first lock groove
442B lock groove opposite first lock groove
443 lower edge
450 support bar
470A second fixing opening
471A second lock opening
471B mating lock opening
V towing vehicle
T trailer tongue.

DETAILED DESCRIPTION OF THE INVENTION

FIG. 1 shows an exploded view of the parts which make up a first embodiment of the present invention. There is a post 10 having a round shape oriented along a generally vertical axis. The post has a top end 11 and a bottom end 12. The top end has a lock opening 13 to which a locking key 14 is fitted. There is a fixing opening 15 in the middle portion of the post. There is a fixing pin 16 sized to fit inside the fixing opening. There is an arm 20 which is generally positioned horizontally. The arm is welded (or otherwise securely attached) to the bottom end of the post. At the other end of the arm, there is an opening (not shown) into which is fitted a conventional hitch ball 30 having a threaded stud 31 by which the hitch ball is secured to the arm by a nut 32.

There is a cylinder 40 which has an inside diameter slightly larger than that of the post. Thus, the post may be inserted into the cylinder and freely rotated or translated. The upper edge 41 of the cylinder is interrupted by a lock groove 42 which is sized to easily accept the lock key 14. The cylinder has a lower edge 43. The cylinder is welded (or otherwise securely attached) to a support bar 50 having a slot 51 and a holding hole 52 sized to receive a holding pin 53.

There is a receiver tube 60 which has an inside opening 61 sized slightly larger than the support bar 50. Thus, the support bar may be inserted and translated inside the receiver tube. The receiver tube has a slot pin opening 62 sized to accept a slot pin 63. The slot pin is sized to fit inside the slot 51. The receiver tube has a holding pin opening 64 which is sized to accept the holding pin 53. The receiver tube is welded, bolted, or otherwise securely attached to a conventional towing vehicle V.

Figure 2:
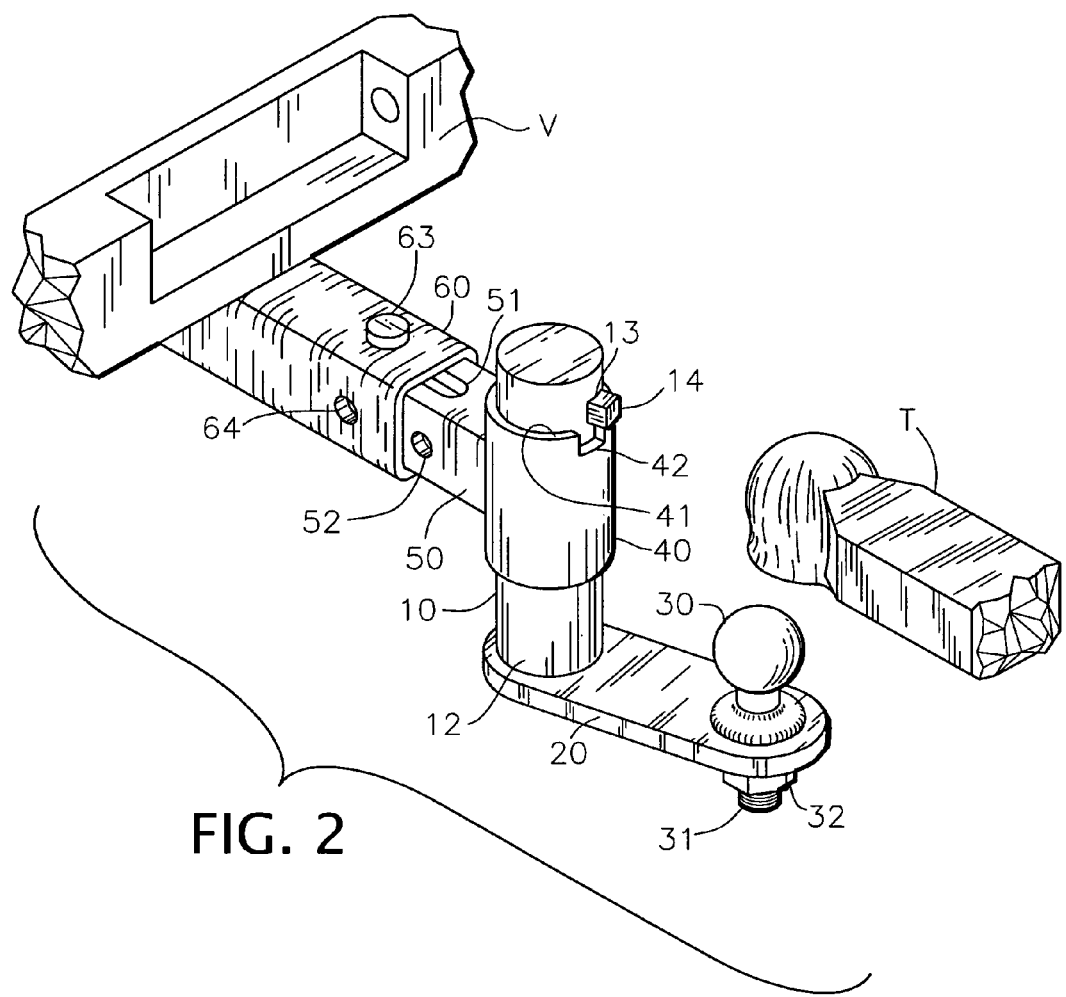
FIG. 2 is a perspective view of the first embodiment assembled in a free position.

Now in FIG. 2 the parts previously described are shown assembled. The lock key 14 is welded (or otherwise securely attached) into the lock opening 13. (Alternately the lock key could be welded directly to the side of the post without being fitted into any opening.) This view shows the parts of the present invention in a "free position" where the lock key is not in the lock groove 42, and the arm 20 is rotated slightly to the right (or alternately left) ready for bringing the trailer near for coupling. This position is but one of many free positions where the hitch ball may be easily moved both vertically and laterally.

FIG. 2 also shows a conventional trailer tongue T brought nearby, or where the towing vehicle V has been brought nearby the trailer tongue. Many such tongues have an adjacent adjustable leg (not shown) which temporarily carries the weight of the tongue. In this view, the adjustable leg has been adjusted so that the tongue is slightly higher than the hitch ball 30.

Figure 3:
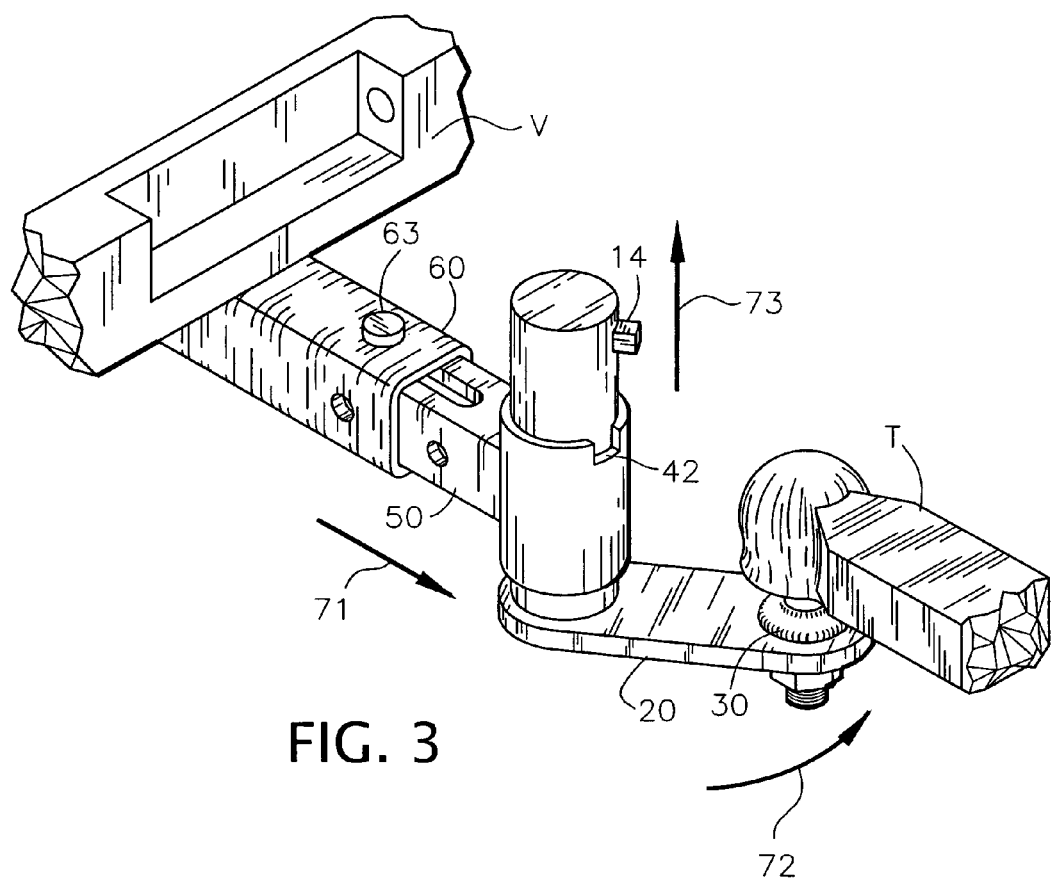
FIG. 3 is a perspective view of the first embodiment having moved to another free position, where a hitch ball has been moved into a trailer tongue.

Now it can be appreciated how the present invention makes trailer coupling easy by referring to FIG. 3 which shows the support bar 50 having extended in a rearward direction according to the arrow noted by reference numeral 71, and arm 20 having swung in a lateral swing-out direction according to the arrow noted by reference numeral 72 below the trailer tongue T and having been lifted in the direction according to the arrow noted by reference numeral 73, so that the hitch ball 30 is easily moved to the trailer tongue (rather than the other way around.) The trailer tongue mechanism (not shown) is latched onto the hitch ball. Even though the coupling has been accomplished in FIG. 3, the present invention is still shown in one of the "free positions" which is not suitable for road towing.

Figure 4:
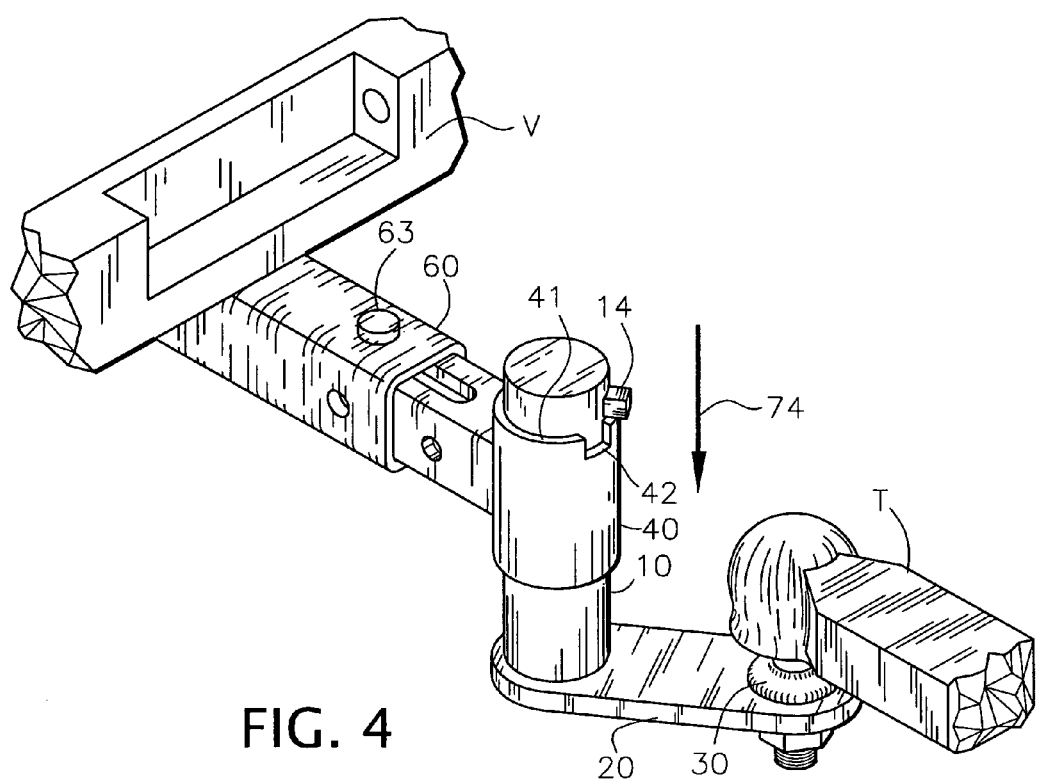
FIG. 4 is a perspective view of the first embodiment having moved to another free position where the weight of the tongue has moved the hitch assembly downward.

FIG. 4 Shows the first embodiment of the present invention where the adjustable leg (not shown) on the trailer tongue T has been adjusted shorter until all of the tongue weight rests on the hitch ball 30. The post 10 and arm 20 have moved in a downward direction according the arrow denoted by reference numeral 74, until the lock key 14 rests upon the upper edge 41 of the cylinder 40. Even though the trailer tongue has been coupled and lowered in FIG. 4, the present invention is still shown in one of the "free positions" which is not suitable for road towing.

Figure 5:
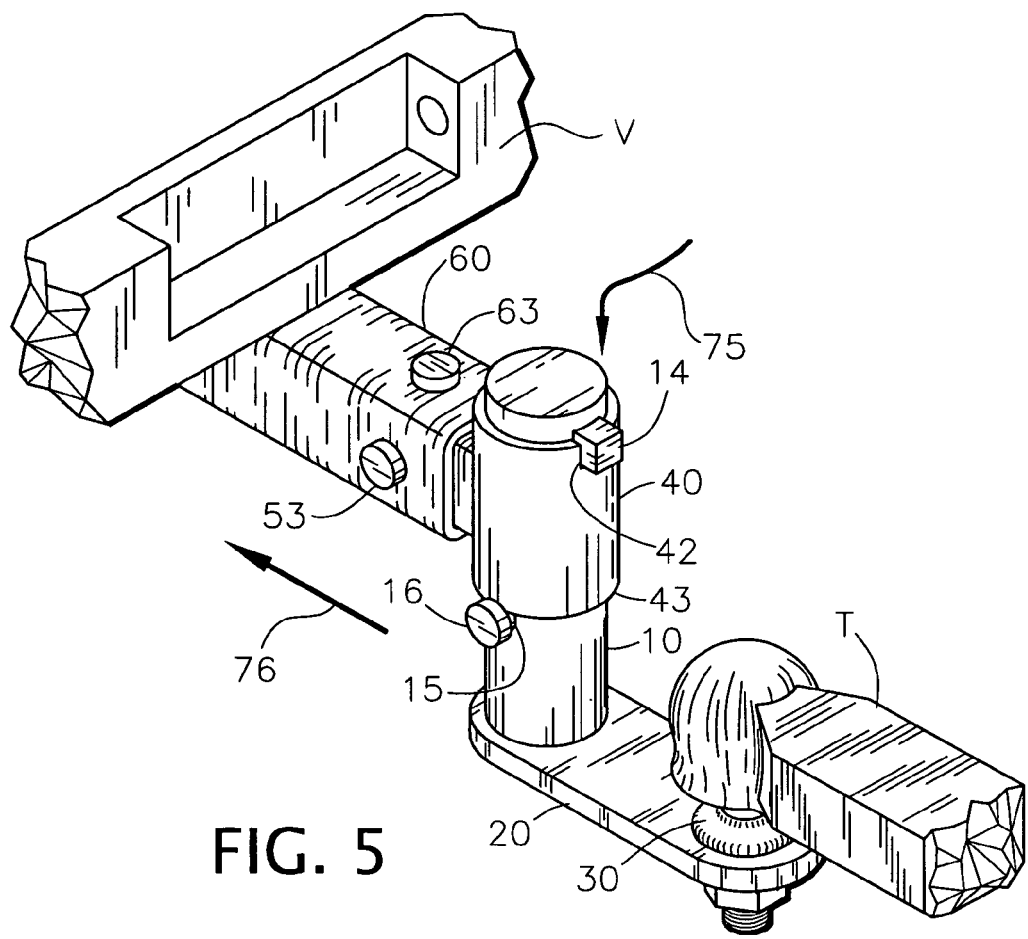
FIG. 5 is a perspective view of the hitch assembly having moved to the locked position, and with the fixing pin and holding pin in place.

Now it can be appreciated how the present invention makes trailer alignment easy by referring to FIG. 5 which shows the arm 20 having swung in and dropped according to the arrow noted by reference numeral 75. Upon reaching this position (and in cooperation with the weight exerted by the trailer tongue T) the lock key 14 is shown engaged into lock groove 42. There are two ways the present invention can be powered to this position. Firstly, the trailer tongue can be manually moved in the desired direction. Secondly, the towing vehicle V can be driven slowly forward, which will cause (due to trailer drag) the arm to automatically swing to the central location followed by gravity dropping the lock key into the lock groove. Finally, the trailer tongue and hitch assembly are shown having been moved in a forward direction according to the arrow denoted by reference numeral 76 and secured from moving by fitting the holding pin 53.

As shown in FIG. 5 this embodiment of the present invention is in a "locked position" where the hitch ball 30 is restrained from moving laterally, and is also restrained from moving downward. However, this position needs to be fixed by means of placing the fixing pin 16 into the fixing opening 15 where the fixing opening in the post 10 is at a location adjacent to the lower edge 43 of the cylinder 40. In this way, the post cannot raise sufficiently to disengage the lock key 14 from the lock groove 42, and the hitch ball is further restrained from moving upward.

Figure 6:
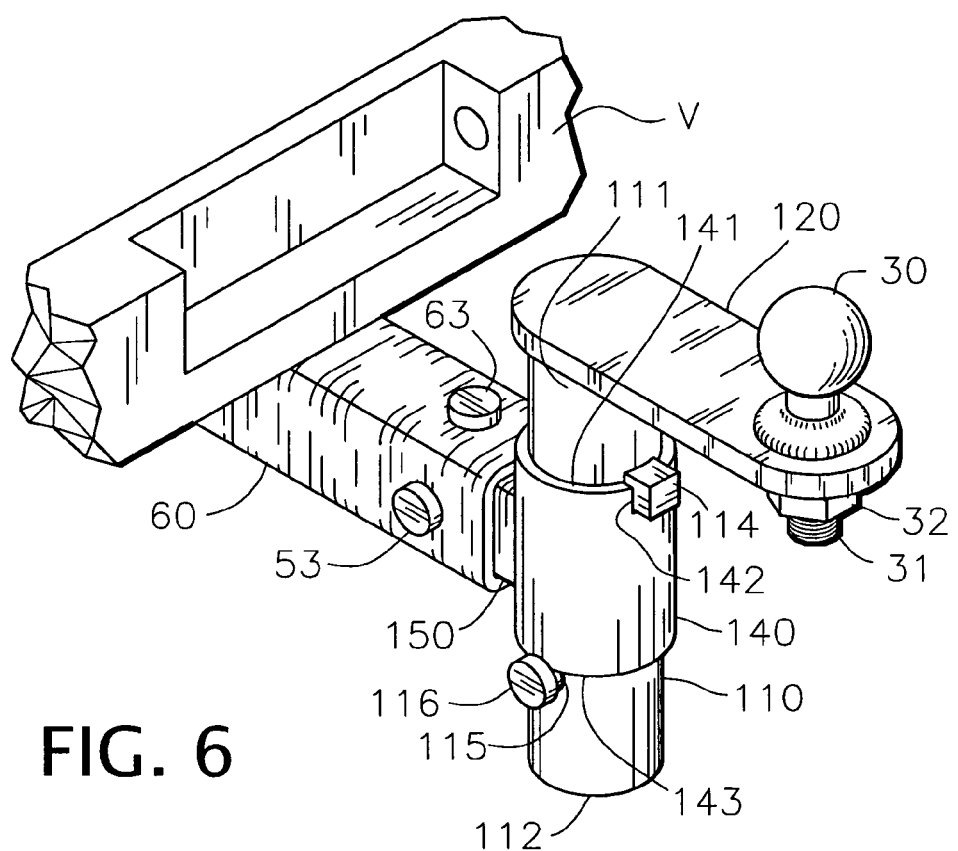
FIG. 6 is a perspective view of a second embodiment of the present invention where an arm is attached to the top end of a post.

FIG. 6 shows an perspective view of a second embodiment of the present invention in a locked position. There is a post 110 having a round shape oriented along a generally vertical axis. The post has a top end 111 and a bottom end 112. There is a lock key 114. There is a fixing opening 115 in the post. There is a fixing pin 116 sized to fit inside the fixing opening. There is an arm 120 generally positioned horizontally. The arm is welded (or otherwise securely attached) to the top end of the post. At the other end of the arm, there is an opening (not shown) into which is fitted a conventional hitch ball 30 having a threaded stud 31 by which the hitch ball is secured to the arm by a nut 32.

There is a cylinder 140 which has an inside diameter slightly larger than that of the post 110. Thus, the post may be inserted into the cylinder and freely rotated or translated. An upper edge 141 of the cylinder is interrupted by a lock groove 142 which is sized to easily accept the lock key 114. The cylinder has a lower edge 143. The cylinder is welded (or otherwise securely attached) to a support bar 150 (having features identical to previously described support bar 50.) The means of attaching and adjusting to the towing vehicle V are identical to the previously described parts, noted by reference numerals 53, 60, and 63. This second embodiment features a high arm 120 position, but otherwise operates identically to the previously described first embodiment.

Figure 7:
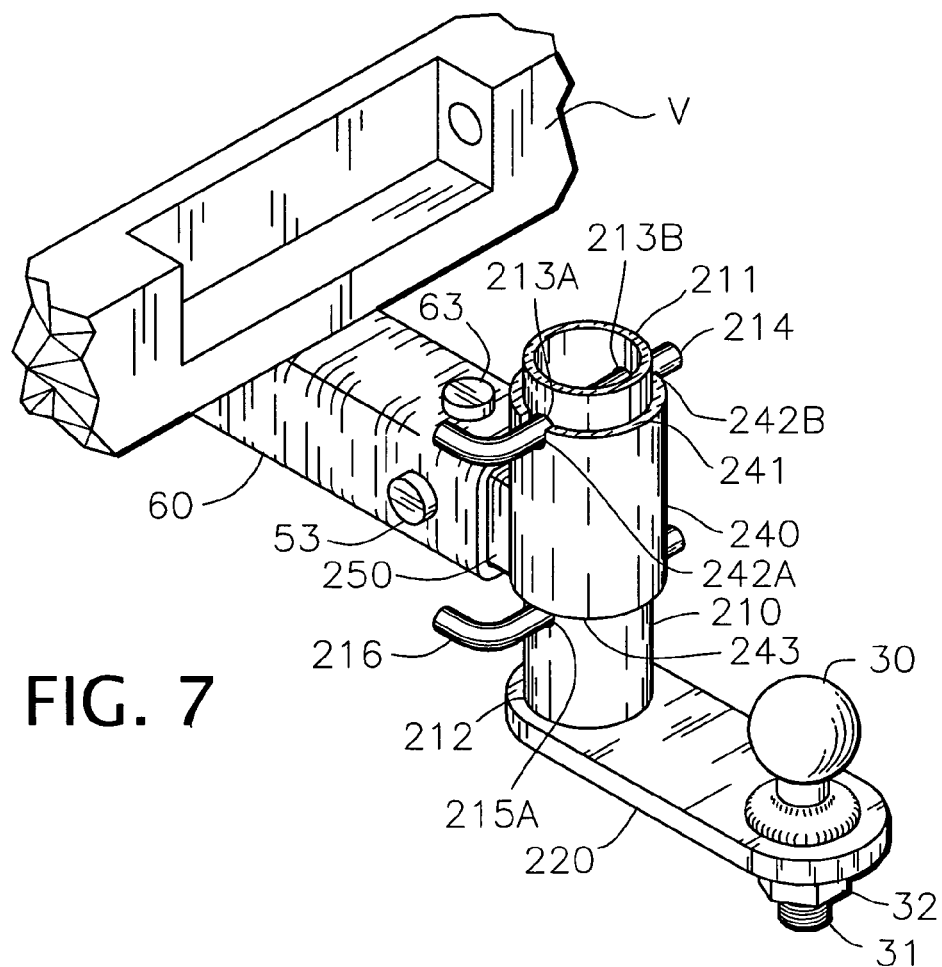
FIG. 7 is a perspective view of a third embodiment of the present invention where the locking means comprises a lock pin.

FIG. 7 shows an perspective view of a third embodiment of the present invention in a locked position. There is a post tube 210 having a round shape oriented along a generally vertical axis. The post tube has a top end 211 and a bottom end 212. There is a lock pin 214. There is a lock opening 213A and a mating lock opening 213B each having a size suitable to receive the lock pin. There is a fixing opening 215A (and a mating fixing opening not shown) in the post tube. There is a fixing pin 216 sized to fit inside the fixing openings. There is an arm 220 generally positioned horizontally. The arm is welded (or otherwise securely attached) to the bottom end of the post tube. At the other end of the arm, there is an opening (not shown) into which is fitted a conventional hitch ball 30 having a threaded stud 31 by which the hitch ball is secured to the arm by a nut 32.

There is a cylinder 240 which has an inside diameter slightly larger than that of the post tube 210. Thus, the post tube may be inserted into the cylinder and freely rotated or translated. An upper edge 241 of the cylinder is interrupted by a first lock groove 242A and a second lock groove 242B, each of which is sized to easily accept the lock pin 214. The cylinder has a lower edge 243. The cylinder is welded (or otherwise securely attached) to a support bar 250 (having features identical to previously described support bar 50.) The means of attaching and adjusting to the towing vehicle V are identical to the previously described parts, noted by reference numerals 53, 60, and 63. This third embodiment features a low arm position, a tubular post construction, a single lock pin for engaging into two lock grooves, and a single fixing pin for fitting into two fitting openings, but otherwise operates identically to the previously described first embodiment.

Figure 8:
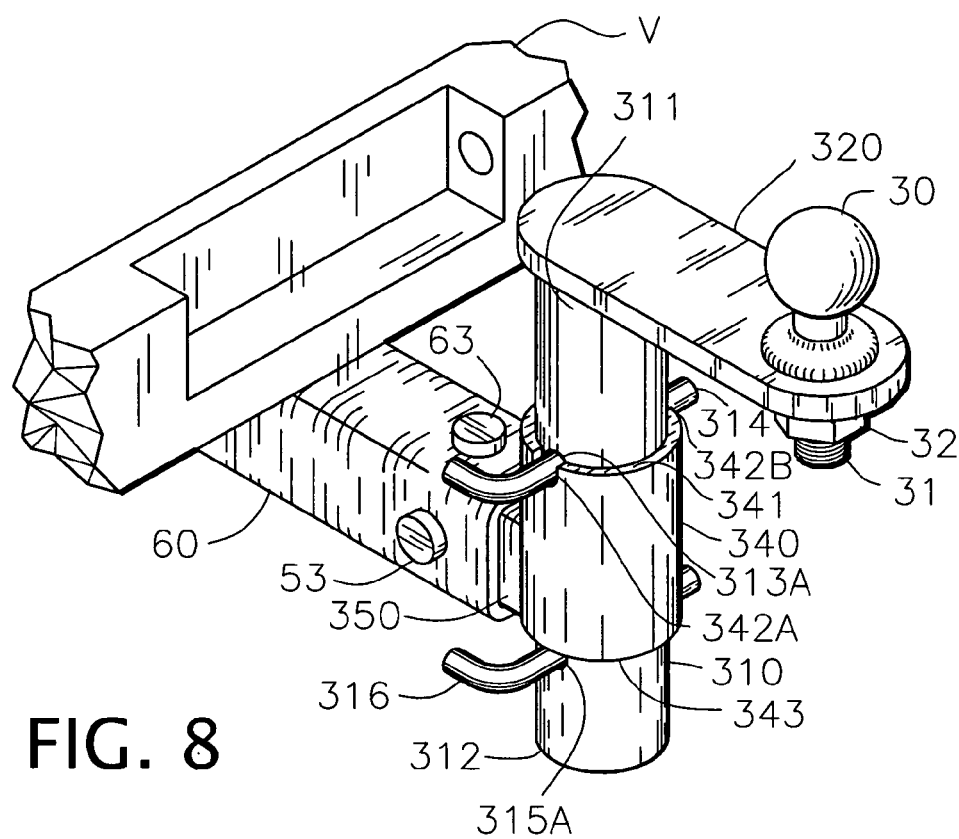
FIG. 8 is a perspective view of a fourth embodiment of the present invention where an arm is attached to a top end of a post and the locking means comprises a lock pin.

FIG. 8 shows an perspective view of a fourth embodiment of the present invention in a locked position. There is a post tube 310 having a round shape oriented along a generally vertical axis. The post tube has a top end 311 and a bottom end 312. There is a lock pin 314. There is a lock opening 313A and a mating lock opening (not shown) each having a size suitable to receive the lock pin. There is a fixing opening 315A (and a mating fixing opening not shown) in the post tube. There is a fixing pin 316 sized to fit inside the fixing openings. There is an arm 320 generally positioned at a horizontal orientation. The arm is welded (or otherwise securely attached) to the top end of the post tube. At the other end of the arm, there is an opening (not shown) into which is fitted a conventional hitch ball 30 having a threaded stud 31 by which the hitch ball is secured to the arm by a nut 32.

There is a cylinder 340 which has an inside diameter slightly larger than that of the post tube 310. Thus, the post tube may be inserted into the cylinder and freely rotated or translated. An upper edge 341 of the cylinder is interrupted by a first lock groove 342A and a second lock groove 342B, each of which is sized to easily accept the lock pin 314. The cylinder has a lower edge 343. The cylinder is welded (or otherwise securely attached) to a support bar 350 (having features identical to previously described support bar 50.) The means of attaching and adjusting to the towing vehicle V are identical to the previously described parts, noted by reference numerals 53, 60, and 63. This fourth embodiment features a high arm position, a tubular post construction, a single lock pin for engaging into two lock grooves, and a single fixing pin for fitting into two fitting openings, but otherwise operates identically to the previously described first embodiment.

Figure 9:
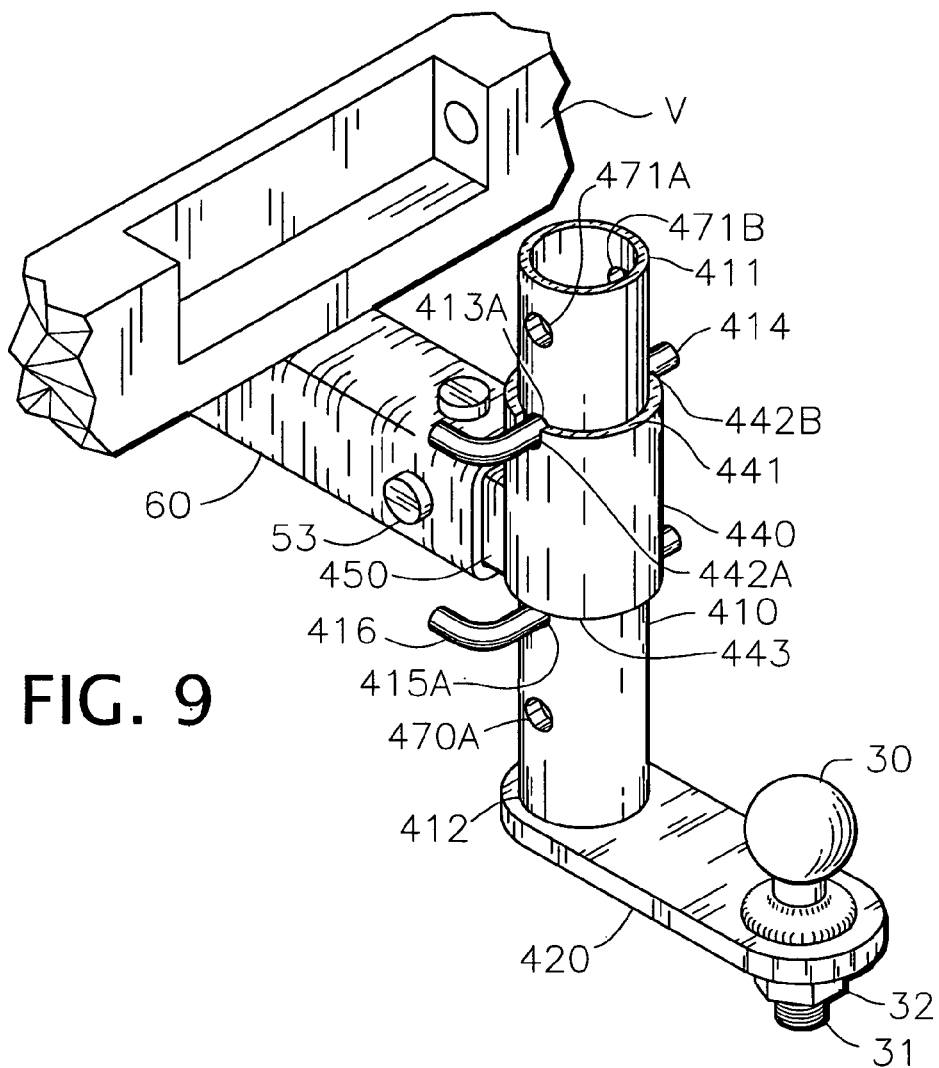
FIG. 9 is a perspective view of a fifth embodiment of the present invention where there are multiple openings for locking and fixing.

FIG. 9 shows an perspective view of a fifth embodiment of the present invention in a locked position. There is a post tube 410 having a round shape oriented along a generally vertical axis. The post tube has a top end 411 and a bottom end 412. There is a lock pin 414. There is a lock opening 413A and a mating lock opening (not shown) each having a size suitable to receive the lock pin. There is a fixing opening 415A (and a mating fixing opening not shown) in the post tube. There is a fixing pin 416 sized to fit inside the fixing openings. There is an arm 420 generally positioned at a horizontal orientation. The arm is welded (or otherwise securely attached) to the bottom end of the post tube. At the other end of the arm, there is an opening (not shown) into which is fitted a conventional hitch ball 30 having a threaded stud 31 by which the hitch ball is secured to the arm by a nut 32.

There is a cylinder 440 which has an inside diameter slightly larger than that of the post tube 410. Thus, the post tube may be inserted into the cylinder and freely rotated or translated. An upper edge 441 of the cylinder is interrupted by a first lock groove 442A and a second lock groove 442B, each of which is sized to easily accept the lock pin 414. The cylinder has a lower edge 443.

There are additional selections of lock opening locations such as second lock opening 471A and mating lock opening 471B for locking use when the post tube 410 is at a lower selected locked position; and there are yet other lock openings (not shown) located inside the cylinder 440 for locking use when the post tube 410 is at a higher selected locked position.

There are additional selections of fixing hole locations such as second fixing opening 470A and mating fixing opening (not shown) for fixing use when the post tube 410 is at a higher selected locked position; and there are yet other fixing holes (not shown) located inside the cylinder 440 for fixing use when the post tube 410 is at a lower selected locked position.

The cylinder is welded (or otherwise securely attached) to a support bar 450 (having features identical to previously described support bar 50.) The means of attaching and adjusting to the towing vehicle V are identical to the previously described parts, noted by reference numerals 53, 60, and 63. This fifth embodiment features a low arm position, a tubular post construction, a single lock pin for engaging into a multiple selection of two lock openings, and a single fixing pin for fitting into a multiple selection of two fitting openings, but otherwise operates identically to the previously described first embodiment.

The first and second embodiments of the present invention feature by way of illustration, a lock key which is fitted or welded into a lock opening, or is simply welded to the side of the post. The third, fourth, and fifth embodiments feature a lock pin, which passes in a removable way through the post and engages with two mating lock grooves, for improved locking strength. However, the present invention will work equally well with either type of lock means, and the inventor envisions the use of yet other lock means, well known in the field, which provide a permanent or removable male protuberance for engaging with the lock groove(s). Thus defined, this function may be more generally described as "locking means for locking."

While various types of pins, having heads or bent ends have been shown by way of illustration in the shown embodiments, the inventor envisions other types and shapes of pins, keys, and fasteners which provide the equivalent action. While not shown for clarity, the inventor admonishes for safety, the use of pins and keys having locking action to prevent accidental removal of the pins, keys, or fasteners due to towing motion and vibrations. These well-known locking actions include screws, nuts, cotter pins, spring pins, grasshopper pins, safety pins, spring-loaded ball locks, and detents.

While the embodiments of the present invention show the common trailer coupling hardware of hitch ball to female receiver cup, other conventional trailer coupling methods would work equally well with the present invention. For instance, the latch over "pintle and ring" coupling could easily be incorporated into the present invention.

While the above descriptions and embodiments contain many specific features by way of example, they should not be construed as limitations on the scope of the invention. Many other variations are possible within the scope of the following claims.

I claim:

1. An adjustable trailer hitch assembly for a towing vehicle comprising:
   a) a post which is generally vertical, the post having a post diameter, the post having a top end and a bottom end, the post having a lock means for locking near the top end,
   b) an arm which is generally horizontal, the arm attached at a first end to said bottom end of said post, the arm attached at a second end to a hitch ball,
   c) a cylinder having an inside cylinder diameter, the cylinder having an upper edge and a lower edge, the upper edge having a lock groove, the lock groove having a size suited to receive said lock means, the cylinder attached by a securing means for securing to said towing vehicle, wherein the inside diameter of the cylinder is slightly greater than said post diameter, wherein said post is fitted inside the cylinder, wherein the adjustable trailer hitch assembly has one or more of a free position, wherein the hitch ball may be moved simultaneously laterally and vertically, wherein the hitch ball may be moved laterally according to the post rotating within the cylinder, and the hitch ball may be moved vertically according to the post sliding axially inside the cylinder, and wherein the adjustable trailer hitch has a locked position wherein the lock means is engaged within the lock groove, wherein the hitch ball is restrained from moving laterally, and wherein the hitch ball is restrained from moving downward.

2. The adjustable trailer hitch assembly of claim 1 wherein the lock means comprises a lock key.

3. The adjustable trailer hitch assembly of claim 1 wherein the lock means comprises a lock pin.

4. The adjustable trailer hitch assembly of claim 1 comprising:
   d) a fixing pin, wherein the post has a fixing opening having a size suited to receive the fixing pin, wherein the fixing opening is located adjacent to the lower edge of the cylinder when the adjustable trailer hitch assembly is in the locked position, wherein if the fixing pin is fitted into the fixing opening, and if the post is moved upward, then the fixing pin would bear upon the lower edge of the cylinder before the lock means would disengage from the lock groove, wherein the hitch ball is further restrained from moving upward.

5. The adjustable trailer hitch assembly of claim 1 wherein said securing means comprises a support bar attached to the cylinder and a receiver tube attached to the towing vehicle, wherein the receiver tube has an inside opening having a size suitable to receive the support bar in a telescoping manner, and wherein the support bar is fitted to the inside of the receiver tube.

6. The adjustable trailer hitch assembly of claim 5, comprising a slot pin and a holding pin, wherein the support bar has a slotted opening having a width suited to receive the slot pin and a holding hole of a size suited to receive the holding pin, wherein the receiver tube has a slot pin opening of a size suited to receive the slot pin, and a holding pin opening of a size suited to receive the holding pin, wherein, if the slot pin is fitted through the slot pin opening and into the slotted opening, and if the holding pin is removed, then the support bar may be moved axially within the receiver tube, and wherein, if the slot pin is fitted through the slot pin opening and into the slotted opening, and if the holding pin is fitted through the holding pin opening and into the holding hole, then the support bar may not be moved axially within the receiver tube.

7. An adjustable trailer hitch assembly for a towing vehicle comprising:
   a) a post which is generally vertical, the post having a post diameter, the post having a top end and a bottom end, the post having a lock means for locking near the top end,
   b) an arm which is generally horizontal, the arm attached at a first end to said top end of said post, the arm attached at a second end to a hitch ball,
   c) a cylinder having an inside cylinder diameter, the cylinder having an upper edge and a lower edge, the upper edge having a lock groove, the lock groove having a size suited to receive said lock means, the cylinder attached by a securing means for securing to said towing vehicle, wherein the inside diameter of the cylinder is slightly greater than said post diameter, wherein said post is fitted inside the cylinder, wherein the adjustable trailer hitch assembly has one or more of a free position, wherein the hitch ball may be moved simultaneously laterally and vertically, wherein the hitch ball may be moved laterally according to the post rotating within the cylinder, and the hitch ball may be moved vertically according to the post sliding axially inside the cylinder, and wherein the adjustable trailer hitch has a locked position wherein the lock means is engaged within the lock groove, wherein the hitch ball is restrained from moving laterally, and wherein the hitch ball is restrained from moving downward.

8. The adjustable trailer hitch assembly of claim 7 wherein the lock means comprises a lock key.

9. The adjustable trailer hitch assembly of claim 7 wherein the lock means comprises a lock pin.

10. The adjustable trailer hitch assembly of claim 7 comprising:
    d) a fixing pin, wherein the post has a fixing opening having a size suited to receive the fixing pin, wherein the fixing opening is located adjacent to the lower edge of the cylinder when the adjustable trailer hitch assembly is in the locked position, wherein if the fixing pin is fitted into the fixing opening, and if the post is moved upward, then the fixing pin would bear upon the lower edge of the cylinder before the lock means would disengage from the lock groove, wherein the hitch ball is further restrained from moving upward.

11. The adjustable trailer hitch assembly of claim 7 wherein said securing means comprises a support bar attached to the cylinder and a receiver tube attached to the towing vehicle, wherein the receiver tube has an inside opening having a size suitable to receive the support bar in a telescoping manner, and wherein the support bar is fitted to the inside of the receiver tube.

12. The adjustable trailer hitch assembly of claim 11, comprising a slot pin and a holding pin, wherein the support bar has a slotted opening having a width suited to receive the slot pin and a holding hole of a size suited to receive the holding pin, wherein the receiver tube has a slot pin opening of a size suited to receive the slot pin, and a holding pin opening of a size suited to receive the holding pin, wherein, if the slot pin is fitted through the slot pin opening and into the slotted opening, and if the holding pin is removed, then the support bar may be moved axially within the receiver tube, and wherein, if the slot pin is fitted through the slot pin opening and into the slotted opening, and if the holding pin is fitted through the holding pin opening and into the holding hole, then the support bar may not be moved axially within the receiver tube.

13. An adjustable trailer hitch assembly for a towing vehicle comprising:
    a) a post which is generally vertical, the post having a post diameter, the post having a top end and a bottom end, the post having one or more of a lock opening near the top end, wherein each of the lock opening(s) has a size suitable to receive a lock pin,
    b) an arm which is generally horizontal, the arm attached at a first end to said bottom end of said post, the arm attached at a second end to a hitch ball,
    c) a cylinder having an inside cylinder diameter, the cylinder having an upper edge and a lower edge, the upper edge having a lock groove, the lock groove having a size suited to receive said lock pin, the cylinder attached by a securing means for securing to said towing vehicle, wherein the inside diameter of the cylinder is slightly greater than said post diameter, wherein said post is fitted inside the cylinder, wherein the adjustable trailer hitch assembly has one or more of a free position, wherein the hitch ball may be moved simultaneously laterally and vertically, wherein the hitch ball may be moved laterally according to the post rotating within the cylinder, and the hitch ball may be moved vertically according to the post sliding axially inside the cylinder, and wherein the adjustable trailer hitch has a one or more of a selected locked position wherein the lock pin is fitted into the selection of one of the lock opening(s), and wherein the lock pin is engaged within the lock groove, wherein the hitch ball is restrained from moving laterally, and wherein the hitch ball is restrained from moving downward.

14. The adjustable trailer hitch assembly of claim 13 comprising:
   d) a fixing pin, wherein the post has one or more of a fixing opening, each having a size suited to receive the fixing pin, wherein a selected fixing opening is located adjacent to the lower edge of the cylinder when the adjustable trailer hitch assembly is in the selected locked position, wherein if the fixing pin is fitted into the selected fixing opening, and if the post is moved upward, then the fixing pin would bear upon the lower edge of the cylinder before the lock pin would disengage from the lock groove, wherein the hitch ball is further restrained from moving upward.

15. The adjustable trailer hitch assembly of claim 13 wherein said securing means comprises a support bar attached to the cylinder and a receiver tube attached to the towing vehicle, wherein the receiver tube has an inside opening having a size suitable to receive the support bar in a telescoping manner, and wherein the support bar is fitted to the inside of the receiver tube.

16. The adjustable trailer hitch assembly of claim 15, comprising a slot pin and a holding pin, wherein the support bar has a slotted opening having a width suited to receive the slot pin and a holding hole of a size suited to receive the holding pin, wherein the receiver tube has a slot pin opening of a size suited to receive the slot pin, and a holding pin opening of a size suited to receive the holding pin, wherein, if the slot pin is fitted through the slot pin opening and into the slotted opening, and if the holding pin is removed, then the support bar may be moved axially within the receiver tube, and wherein, if the slot pin is fitted through the slot pin opening and into the slotted opening, and if the holding pin is fitted through the holding pin opening and into the holding hole, then the support bar may not be moved axially within the receiver tube.

* * * * *